Aug. 11, 1970     O. K. AUSTIN ET AL     3,523,758
APPARATUS FOR PRODUCING CARBON BLACK
Filed Oct. 16, 1967     4 Sheets-Sheet 3
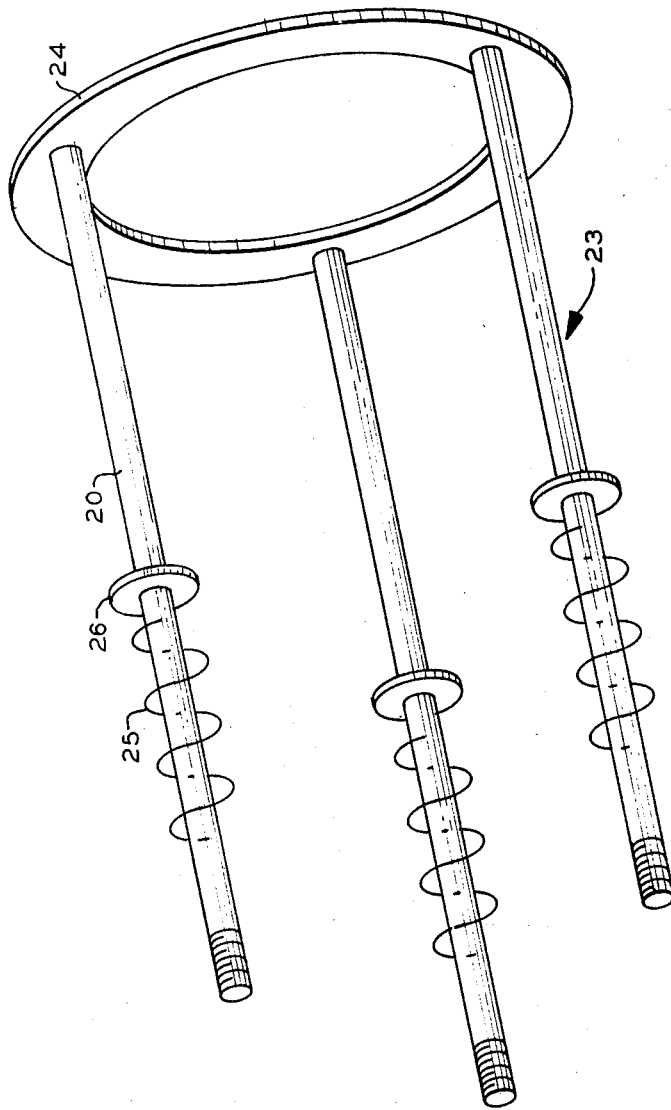
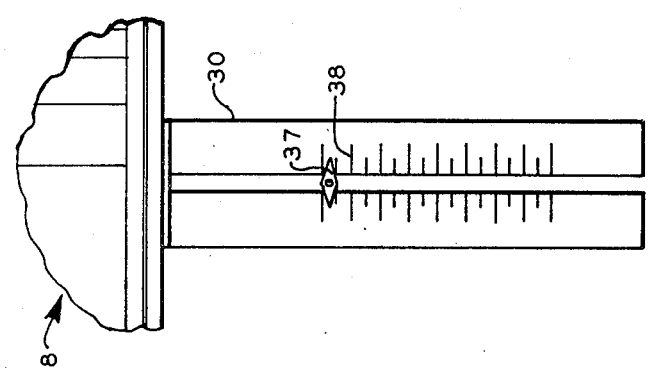
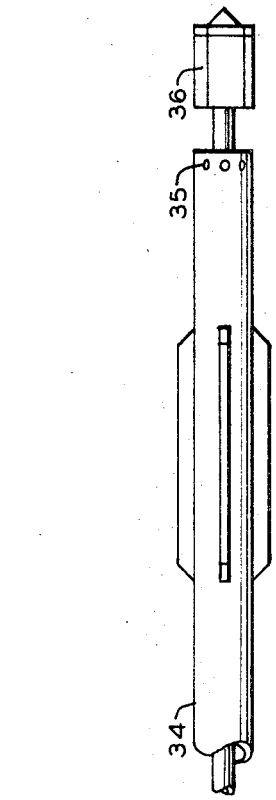
INVENTORS
O. K. AUSTIN
C. R. VENABLE, JR
BY *Young & Quigg*
ATTORNEYS United States Patent Office 3,523,758
Patented Aug. 11, 1970

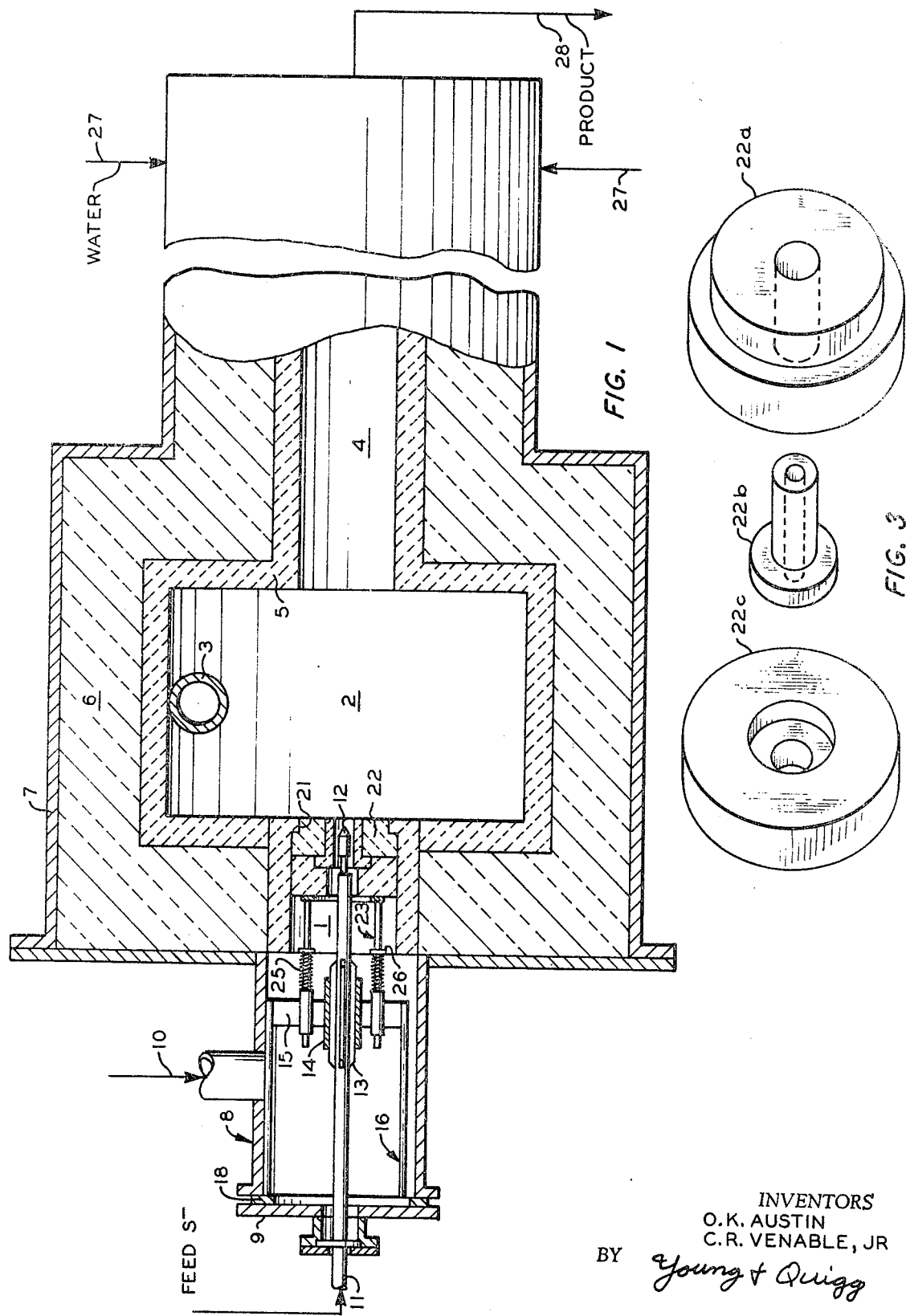

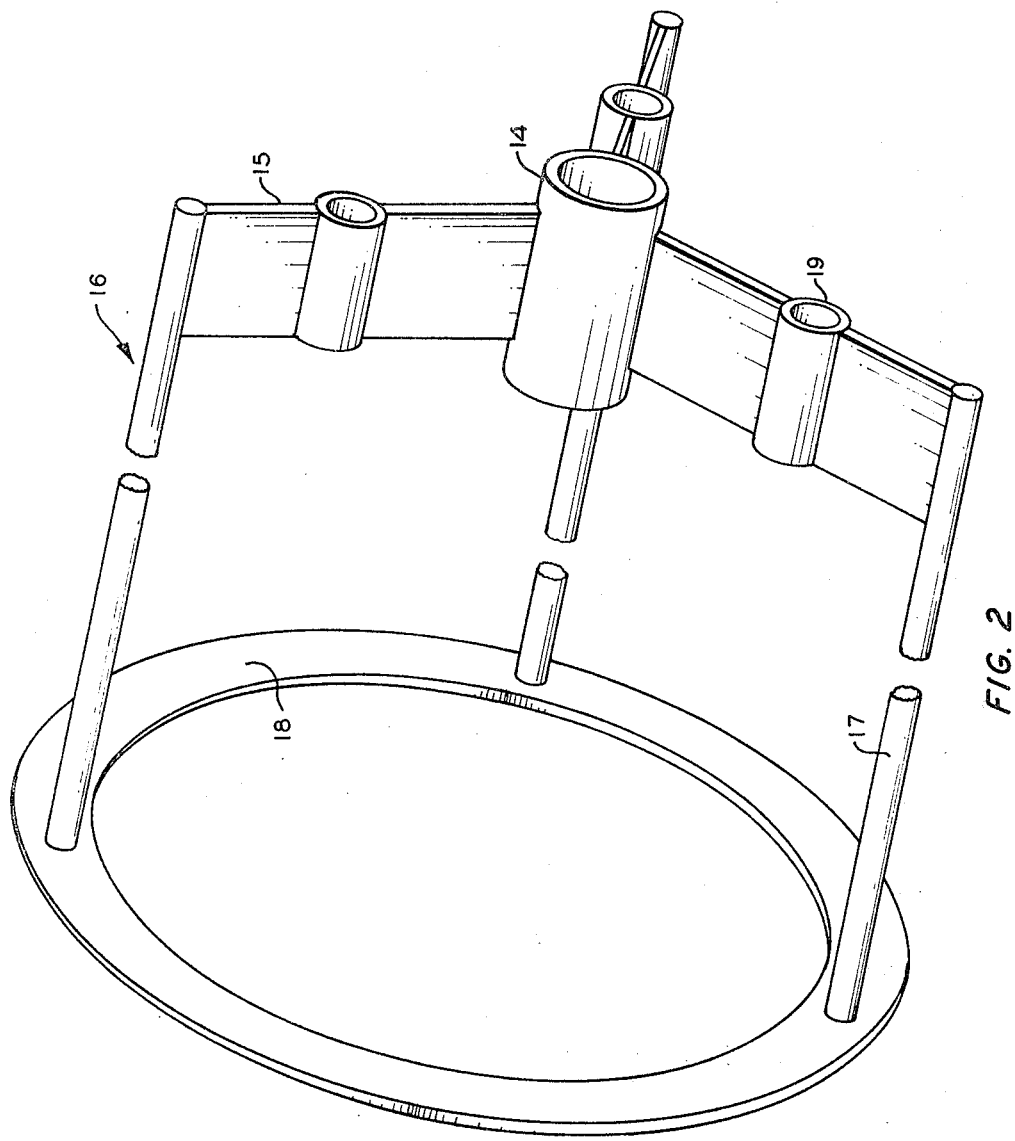

3,523,758
APPARATUS FOR PRODUCING CARBON BLACK
Oliver K. Austin and Charles R. Venable, Jr., Bartlesville, Okla., assignors to Phillips Petroleum Company, a corporation of Delaware
Filed Oct. 16, 1967, Ser. No. 675,517
Int. Cl. C09c 1/48, 1/50; C10b 47/04
U.S. Cl. 23—259.5
5 Claims

ABSTRACT OF THE DISCLOSURE

A carbon black producing apparatus readily convertible from 2 to 3 axially aligned combustion zones for producing low, regular, and high structure carbon blacks.

---

This invention relates to the production of carbon black. In another aspect, this invention relates to an improved apparatus adapted to produce high, regular, and low structure carbon blacks.

The grade of a carbon black depends to a large extent upon the particular process by which it is produced. Carbon blacks are normally graded or classified on the basis of structure, which means characteristics of carbon black relating to the flocculation of the particles. While the classifications of structure in carbon black are relative, the commercial carbon blacks can be classified generally as high structure, normal structure, or regular structure, and low structure. Therefore, when the structure is said to be low there is little tendency for the particles to form chains of particles and when the structure is said to be high, there is a strong tendency for the particles to form such chains. It is well known that there are different commercial applications for all structures, i.e., high, regular and low.

As stated above, the structure of carbon blacks to a large extent depends upon the particular process by which they are produced. One such process is disclosed in U.S. Pat. 2,564,700 (1951). This process will produce low and regular structure carbon blacks.

Recently, a furnace-type process has been developed which involves the use of three axially aligned reaction zones and yields carbon blacks of high structural characteristics. This improved process generally comprises introducing a first stream of a free oxygen-containing gas into the upstream end of a generally cylindrical first zone having a length greater than its diameter; introducing a stream of a hydrocarbon feedstock into said first zone and into said free oxygen-containing gas therein at a point downstream from the point of introduction of said free oxygen-containing gas and upstream from the downstream end of said first zone; passing the resulting admixture from said first zone into a generally cylindrical second zone having a diameter greater than its legnth and greater than the diameter of said first zone, the upstream end of said second zone being in open communication with and axially aligned with the downstream end of said first zone; introducing a second stream of gas comprising a free oxygen-containing gas into said second zone to establish a mass of gas surrounding said admixture introduced from said first zone; passing said admixture from said second zone surrounded by said mass of gas into a generally cylindrical third zone having a length greater than its diameter and a diameter less than the diameter of said second zone; forming said carbon black product from said feedstock by decomposition of same under carbon black producing conditions in said first, second, and third zones; and separating said carbon black from the gaseous effluent from said third zone.

Preferably, the first stream of free oxygen-containing gas in introduced longitudinally into the upstream end of said first zone and the second stream of free oxygen-containing gas is introduced tangentially into the second zone to establish a rotating mass of gas in said second zone. The stream of feedstock is introduced into the first zone and into the first stream of free oxygen-containing gas at a point downstream from the point of introduction of the first stream of free oxygen-containing gas and upstream from the upstream end of the second zone. The resulting admixture from the first zone is then passed axially through the second zone, and axially into the third zone while surrounded by the rotating mass of gas from the second zone.

In one embodiment of this process, a stream of a fuel is introduced into admixture with the stream of air in the first zone at a point upstream from the point of introduction of the hydrocarbon feedstock. In still another embodiment, the introduction of this fuel into the first zone is omitted and the first stream of free oxygen-containing gas which is introduced into the second zone comprises a stream of hot combustion gases resulting from the substantially complete combustion of a combustible mixture of a fuel with an excess of air introduced into a tunnel combustion zone communicating with the second zone. Preferably, the tunnel combustion zone communicates tangentially with the second zone.

Generally speaking, as the amount of the axially introduced free oxygen-containing gas of the first stream is increased, the structure characteristics of the carbon black product also increases, i.e., there is obtained a carbon black product having a high structure. As the point of introduction of feedstock into said first reaction zone is moved upstream from the entrance of said second reaction chamber, there is obtained an increase in the structure characteristics of the carbon black product.

From the above discussion, it is readily apparent that when it was heretofore desired to manufacture both high and regular structure carbon black, it was also necessary to have different carbon black producing devices. Therefore, there is needed an apparatus that will not only produce high structure carbon blacks in a manner described above, but also, low and regular structure carbon blacks in a manner as disclosed in U.S. Pat. 2,564,700.

Therefore, one object of this invention is to provide an improved apparatus for making carbon black.

Another object of this invention is to provide a carbon black producing apparatus which is readily convertible from 2 to 3 axially aligned combustion zones for producing low, regular, and high structure carbon blacks.

According to one embodiment of this invention, there is provided an improved carbon black furnace that is convertible to produce low, regular, and high structure carbon blacks. According to a preferred embodiment of this invention, a carbon black furnace containing three axially aligned cylindrical reaction chambers is provided with an annular plug support means positioned adjacent the outlet of the first or upstream cylindrical reaction chamber, and a removable annular plug which is held against the annular plug support means by suitable means such as a spring biased frame. Thus, when the annular plug has been placed in the first cylindrical reaction chamber, the outlet of the hydrocarbon feedstock conduit is axially positioned within the opening of said annular plug so that hydrocarbon feedstock can be introduced axially into the second cylindrical reaction chamber to thereby produce both regular and low structure carbon black. When it is desired to produce carbon black of high structural characteristics, the plug is removed from the first cylindrical reaction chamber to yield the three above-described axially aligned combustion chambers suitable for producing high structure carbon black. Suitable fluid introduction conduit means are provided to operate with both of the internal furnace configurations.

According to another embodiment of this invention, an extended chamber is connected to the inlet of said first cylindrical reaction chamber having a means to introduce free oxygen-containing gas thereto. This chamber is equipped with a removable door covering an opening in axial alignment with the first cylindrical reaction chamber. A sealing means such as a packing gland is positioned through this door for holding a fluid introduction conduit means. A conduit support means comprising, for example, a spider support attached to a holding ring is positioned in said extended chamber and supports said fluid introduction conduit means. A removable pressure holding means such as a spring biased frame is positioned within said extended chamber to hold said annular plug against said annular plug support means.

In a preferred embodiment of this invention, the annular plug comprises a composite interlocking structure adapted for easy insertion and removal from said first cylindrical reaction zone.

The drawing indicates several embodiments of this invention.

FIG. 1 is an illustration partly in section of an improved carbon black apparatus of this invention adapted to produce low and regular structure carbon blacks.

FIG. 2 is a perspective view of the conduit holding frame of this invention.

FIG. 3 is an exploded perspective view of the composite type annular plug of FIG. 1.

FIG. 4 is a perspective view of the pressure frame in FIG. 1.

FIG. 6 is a view partly in section of a fluid introduction conduit of FIG. 5.

FIG. 7 is a plan view of the extended chamber on the apparatus of FIG. 5.

Figure 5:
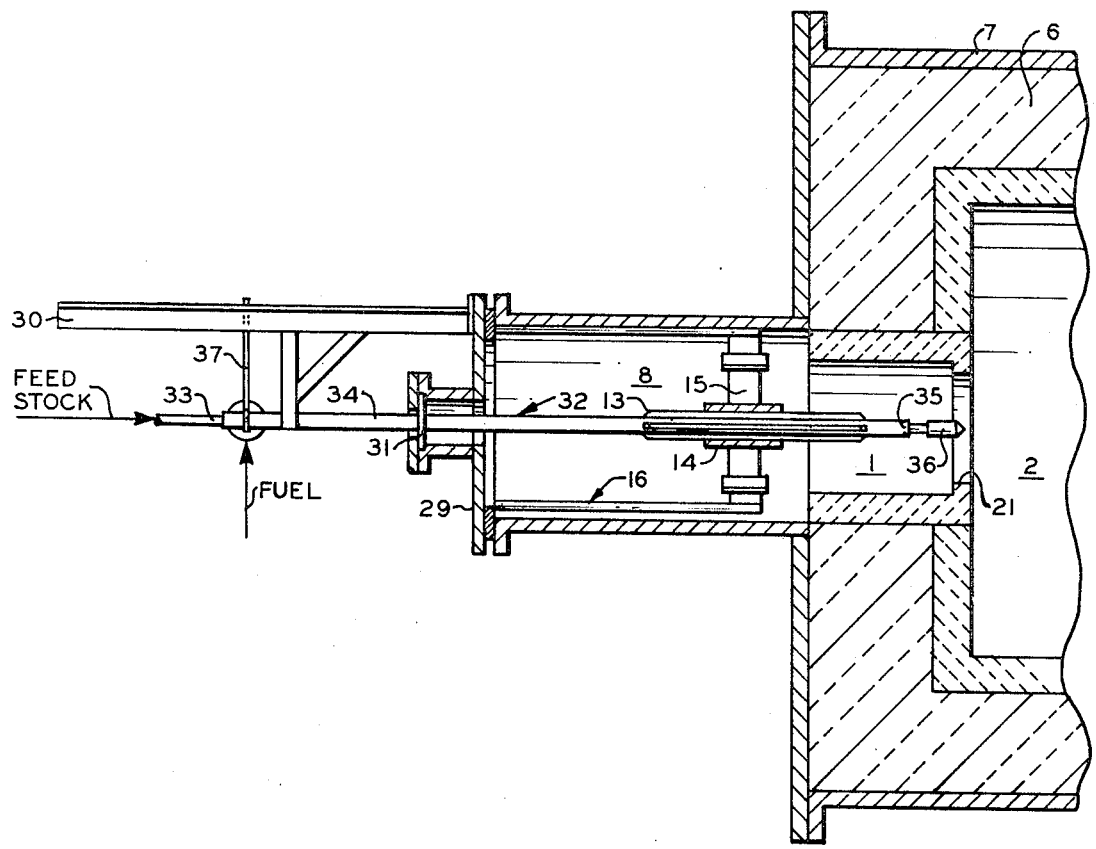
FIG. 5 is an illustration partly in section of an apparatus of this invention adapted to produce high structure carbon black.

Referring to FIG. 1, reaction chamber 1 comprises a cylindrical chamber preferably having a length greater than its diameter. Reaction chamber 2 is a cylindrical reaction chamber preferably, having a diameter greater than its length and greater than the diameter of reaction chamber 1. Reaction chamber 2 is in axial alignment with and connected at its upstream end to the downstream end of reaction chamber 1. At least one inlet tunnel 3 communicates with reaction chamber 2. In the embodiment described herein inlet tunnel 3 communicates tangentially with reaction chamber 2. Reaction chamber 4 is a cylindrical chamber preferably, having a length greater than its diameter and a diameter less than the diameter of reaction chamber 2. Reaction chamber 4 is in axial alignment with and connected at its upstream end to the downstream end of reaction chamber 2. The reaction chambers are all lined with a refractory lining 5 made of a highly refractory material such as sillimanite, alumina, or other refractory materials suitable for the purpose. A layer of insulating material 6 surrounds refractory liner 5. A steel shell 7 is positioned around insulating material 6.

Extended chamber 8 is attached to steel shell 7 by suitable means such as welding and is disposed so that its opening carries removable door 9 and is positioned in alignment with cylindrical reaction chamber 1. Air introduction conduit 10 is attached to extended chamber 8 as illustrated in FIG. 1.

Feedstock introduction conduit 11 has nozzle 12 connected to its outlet end and carries spacing fins 13 intermediate the ends. Spacing fins 13 fit within conduit support ring 14 which in turn is held within extended chamber 8 by support legs 15 (attached to the periphery of support ring 14).

FIG. 2 is a perspective view of support rack 16 comprising conduit support ring 14, support legs 15, pressure bars 17 and annular ring 18. Conduit support frame 16 fits within elongated chamber 8 as illustrated in FIG. 1, and is easily removable therefrom when converting the apparatus to a high structure producing apparatus as will be discussed below. As shown in FIGS. 1 and 2, support legs 15 carry conduits 19 therein for holding rods 20 therein in slidable contact in a manner as will be described below.

As illustrated in FIGS. 1 and 5, plug support ridge 21 is positioned around the outlet of cylindrical reaction chamber 1. Referring again to FIG. 1, annular plug 22 carrying an external indentation which matches with ridge 21 is forced against ridge 21 by a suitable means. Annular plug 22 can be either a one-piece plug or a composite plug such as the three-piece plug as illustrated in FIG. 1 and in FIG. 3.

Referring to FIG. 3, there is illustrated an exploded perspective view of composite plug 22 comprising sections 22a, 22b, and 22c. As illustrated, section 22a comprises an annular member having an outside diameter slightly smaller than the inside diameter of the first cylindrical reaction chamber and carrying a recess around the leading end thereof that matches with ridge 21 adjacent the outlet of first cylindrical reaction chamber. Section 22b comprises a body portion and a lip portion, the body part having an outside diameter slightly smaller than the inside diameter of section 22a and an inside diameter slightly larger than fluid introduction conduit means 11, the body portion extending through section 22a, and the lip portion contacting the back portion of section 22a when the body is inserted therein. Section 22c has an outside diameter slightly smaller than the inside diameter of the first cylindrical reaction chamber and an inside diameter greater than the diameter of the fluid introduction conduit means, and a recess adjacent the inside diameter of the leading portion thereof adapted to receive the lip from section 22b when the composite plug components are assembled. This composite plug is preferred because it is easily assembled when inserted within cylindrical reaction chamber 1 and will effectively seal cylindrical reaction chamber 1 from hot combustion gases produced within cylindrical reaction chamber 2. Annular plug 22 can be made from any suitable material, but is preferably made from a ceramic material similar to ceramic lining 5. Preferably, section 22c is made of an insulating-type refractory.

As illustrated in FIG. 1, pressure frame 23 holds annular plug 22 firmly against ridge 21. Pressure frame 23 will be explained by reference to FIGS. 1 and 4. Annular pressure ring 24 sets against the rear portion of plug 22 (plug section 22c) and carries pressure rods 20 thereon. Pressure rods 20 are provided with springs 25 positioned adjacent stops 26 thereon. Stops 26 can be washers attached to pressure rods 20, for example, by welding. The ends of pressure rods 20 fit in slidable contact through conduits 19 and can be threaded to carry retaining nuts to thereby attach pressure frame 23 to support rack 16. Thus, when rack 16 carrying pressure frame 23 is inserted within extended chamber 8 and door 9 is bolted shut, annular pressure ring 24 will be held firmly against the rear portion of annular plug 22 by the action of springs 25. This action will assure that the composite plug members 22a, 22b, 22c (FIG. 3) will be forced together and that the recess carried by 22a will fit in locking engagement with ridge 21 carried adjacent the outer periphery of cylindrical reaction chamber 1.

Thus, in the operation on one embodiment of this invention, with the apparatus assembled as illustrated in FIG. 1, a combustible mixture of fuel is introduced into inlet tunnel 3 which communicates tangentially with cylindrical reaction chamber 2. The fuel used in forming such combustible mixture can be any suitable fuel in the solid, liquid, or gaseous phase. Generally, a gaseous fuel, such as natural gas is preferred. The burning of this combustible mixture (flame and combustion products) enters reaction chamber 2 and follows a spiral path around the same toward the axis thereof. A reactant feed such as hydrocarbon oil, passes through conduit 11 and nozzle 12 and is passed axially into the reaction chamber 2. Jacket air passes from conduit 10 and around nozzle 12 to reaction chamber 2. Carbon black is formed within reaction chambers 2 and 4, and the reaction mixture is quickly cooled to a temperature below that at which carbon black formation takes place as it leaves reaction chamber 4. This cooling can be effected in any known manner such as by means of water introduced by conduits 27. The cooled product is then removed via conduit 28. This process will generally form low and regular structure carbon black. The apparatus of FIG. 1 is converted to an apparatus suitable for producing high structure carbon black in a manner as will be described below.

The apparatus of FIG. 1 can be converted to a process for producing high structure carbon black by removing annular plug 22 from adjacent the periphery of the outlet of the first cylindrical reaction zone. A preferred apparatus for producing high structure carbon black is illustrated in FIG. 5. As illustrated, annular plug 22 has been removed from the first cylindrical reaction chamber. Also, pressure frame 23 has been removed from the leading portion of frame 16. Door 9 (FIG. 1) has been replaced by door 29 having a linear scale frame 30 extending therefrom and a packing gland 31 positioned therethrough. Feedstock conduit 11 has been replaced by conduit 32. Conduit 32 is illustrated in FIG. 6 and comprises feedstock conduit 33 positioned within fuel conduit 34. As illustrated, feedstock conduit 33 is sealed within fuel conduit 34 through enclosures adjacent the inlet end and outlet end thereof. Openings 35 are positioned adjacent to the outlet end of fuel conduit 34. Nozzle 36 is positioned on the outlet end of feedstock conduit 33. It must be noted that this apparatus can be operated with a single feedstock introduction conduit 11 as illustrated in FIG. 1; however, the use of the fuel introduction conduit is a preferred embodiment of this invention.

Now referring again to FIG. 5, it is readily seen that the outlet end of conduit means 32 can be positioned at a longitudinal point within cylindrical reaction chamber 1 by merely sliding conduit 32 as desired through packing gland 31. Arm 37 is connected adjacent the inlet end of conduit 32 and extends to linear scale frame 30. As illustrated in FIG. 7 which is a plan view of extended chamber 8 of FIG. 5, the upper portion of arm 37 has a point attached thereto and the top of frame 30 carries a linear scale 38 thereon. Therefore, the position of the outlet end of conduit 32 can be determined at any time as indicated by the pointer on the top of arm 37 and scale 38. As illustrated, scale 38 reads in inches from the outlet end of cylindrical reaction chamber 1. Any suitable scale can be provided for any suitable reaction chamber length.

Now referring to the operation of the apparatus in FIG. 5, the outlet end of conduit 32 is positioned at any desired point within cylindrical chamber 1, and a combustible mixture is passed out inlet tunnel 3 in a manner as was described in conjunction with FIG. 1. A stream of air is introduced into air conduit 10 and flows longitudinally through extended chamber 8 and cylindrical reaction chamber 1. At this time, a stream of vaporous fuel such as natural gas or vaporized liquid is passed into conduit 34 of conduit means 32 and exits substantially radially therefrom via openings 35 into admixture with the longitudinally flowing stream of air from conduit 10. A reactant feedstock, such as hydrocarbon oil, passes from conduit 33 of conduit means 32 and is sprayed into the mixture of vaporous fuel and air by nozzle 36. The resulting mixture then passes axially through reaction chamber 1 and enters reaction chamber 2 which contains the spirally moving combustion mixture from inlet tunnel 3. The resulting admixture then enters cylindrical reaction chamber 4 wherein the formation of the carbon black product is completed. Thus, the formation of the carbon black product is initiated in cylindrical reaction chamber 1, carried forward in cylindrical reaction chamber 2, and completed in cylindrical reaction chamber 4. The resulting admixture is then cooled and removed in a similar manner as described in conjunction with the operation of the apparatus as illustrated in FIG. 1.

The following example will serve to further illustrate this invention.

EXAMPLE

Test runs 2 through 6 below were conducted in a 3-chambered furnace similar to the furnace illustrated in FIG. 5 wherein the annular plug 22 was not positioned at the outlet of the first cylindrical reaction zone 1. In the reactor employed, the first cylindrical reaction zone 1 was twelve inches in diameter and 45 inches in length. The second cylindrical reaction zone 2 was 37 inches in diameter and 12 inches in length. The third cylindrical reaction zone was 12 inches in diameter.

The reaction zones used for the process of run 1 have the configuration as illustrated in FIG. 1 wherein annular plug 22 is positioned at the outlet of the first cylindrical reaction zone 1. Thus, cylindrical reaction zone 2 had a diameter of 37 inches and a length of 12 inches, and cylindrical reaction zone 4 was 12 inches in diameter.

The feedstock used was a conventional commercial aromatic concentrate feedstock prepared by liquid sulfur dioxide extraction of cycle oils obtained in the catalytic cracking of gas-oils. The feedstock had a BMCI value of 91. Typical properties of this feedstock are set forth in Table I below:

TABLE I

Oil Feedstocks

| | |
|---|---|
| Gravity, °API | 11.4 |
| ASTM vac. dist. ° F. at 760 mm. Hg, percent condensed: | |
| 2 | 539 |
| 5 | 564 |
| 10 | 586 |
| 20 | 606 |
| 30 | 624 |
| 40 | 639 |
| 50 | 657 |
| 60 | 671 |
| 70 | 691 |
| 80 | 715 |
| 90 | 749 |
| 95 | 784 |
| BMCI [1] | 91 |
| Carbon, wt. percent | 89.0 |
| Hydrogen, wt. percent | 9.3 |

[1] Bureau of Mines Correlation Index.

The following series of runs illustrate the effect of positioning annular plug 22 at the outlet of first cylindrical reaction zone 1. The runs also illustrate the effect of changing the position of the point of introduction of the oil feedstock into the first cylindrical reaction zone 1. Operating conditions, yields of carbon black, and tests on the carbon black products are set forth in Table II below.

Run 1 illustrates the effect of operating the furnace as illustrated in FIG. 1 wherein the annular disk is positioned at the outlet of the first cylindrical reaction zone 1 to yield an internal furnace configuration of the two axially aligned cylindrical reaction zones as illustrated. Runs 2–6 illustrate the effect on the carbon black product when the distance between the oil feedstock discharge nozzle 36 (FIG. 5) and the entrance to the second cylindrical combustion zone 2 was incrementally increased.

TABLE II

|  | Run No. | | | | | |
|---|---|---|---|---|---|---|
|  | 1 | 2 | 3 | 4 | 5 | 6 |
| Oil charge: | | | | | | |
| Rate, gal./hr | 248 | 169 | 169 | 169 | 169 | 169 |
| Preheat, °F | 550 | 550 | 550 | 550 | 550 | 550 |
| Nozzle location, inches [1] | 0 | 6 | 8 | 10 | 12 | 19 |
| Spray pressure | | 120 | 120 | 120 | 52 | 120 |
| Air and gas rates: | | | | | | |
| Axial air, Mc.f.h | [2]4 | 75 | 75 | 75 | 75 | 75 |
| Tangential air, Mc.f.h | 250 | 75 | 75 | 75 | 75 | 75 |
| Axial air, percent of total air | 1.6 | 50 | 50 | 50 | 50 | 50 |
| Axial gas, Mc.f.h | 0 | 3.0 | 3.0 | 3.0 | 3.0 | 3.0 |
| Tangential gas, Mc.f.h | 16.7 | 5.0 | 5.0 | 5.0 | 5.0 | 5.0 |
| Total air/oil ratio, c.f./gal | 1,021 | 888 | 888 | 888 | 888 | 888 |
| Carbon black product: | | | | | | |
| Yield, lbs./gal | 3.05 | 3.25 | 2.86 | 2.86 | 2.84 | 2.74 |
| Photelometer | 90 | 91 | 92 | 91 | 96 | 93 |
| $N_2$ surface area, sq. m./g | 126.0 | 106.8 | 110.0 | 110.6 | 117.5 | 126.1 |
| Oil absorption, cc./g | 1.38 | 1.55 | 1.69 | 1.74 | 1.78 | 1.85 |

[1] Measured from upstream entrance to second combustion zone 2.
[2] Jacket air.

Samples of the carbon black products from runs 1 and 5 were compounded with a natural rubber to produce a series of rubber compositions. The following recipe employed in preparing said rubber composition was as follows:

Components: Parts by wt.
- Liberian crepe _____ 100
- Carbon black _____ 50
- Zinc oxide _____ 5
- Altax [1] _____ 0.06
- Sulfur _____ 2.5
- Stearic acid _____ 3.0

[1] Benzothiazyl disulfide

Said rubber compositions were each cured to a finished rubber by curing at 293° F. for thirty minutes. The resulting cured rubber compositions were tested in accordance with standard rubber testing procedures. The results of these tests are set forth below:

| Evaluation of carbon black in natural rubber | Run 1 | Run 5 |
|---|---|---|
| 300% modulus, p.s.i | 2,240 | 2,590 |
| Tensile, p.s.i | 3,400 | 2,640 |
| Elongation, percent | 430 | 320 |

From an examination of these tests, it will be noted that the 300% modulus value for the rubber containing the carbon black from run 5 was 350 pounds higher than the value from the rubber containing the carbon black from run 1, thus confirming the increase in structural characteristics as shown by the increase of oil absorption values in Table II.

While this invention has been described by certain specific embodiments thereof, it is to be understood that they were not intended to limit the scope of this invention:

We claim:

1. In a carbon black reactor comprising a plurality of reaction chambers in axial contiguous alignment including a first reaction chamber positioned upstream of and opening into a second reaction chamber, said first reaction chamber being adapted for axial introduction of reactants and said second reaction chamber being adapted for introduction of reactants through its periphery, the improvement comprising:

a first member removably positionable proximate the downstream end of said first reaction chamber and forming a first passageway opening into said second reaction chamber;

a second member removably positionable upstream of said first member and forming a second passageway, said second passageway providing open communication between said first reaction chamber and said first passageway; and, a reactant inlet conduit adapted for axial introduction of a plurality of reactants into the reactor, said conduit being positionable to discharge at least one of said reactants into said first passageway and one of said reactants into said second passageway.

2. The apparatus as defined in claim 1 wherein said reactant inlet conduit is positionable to discharge at least one of said reactants into said second reaction chamber.

3. The apparatus as defined in claim 1 in which said first member and said second member are retained in position by means supported from said reactant inlet conduit.

4. The apparatus as defined in claim 3 in which said means comprises a pressure holding means including a ring positionable against said second member, said ring being supported from said reactant inlet conduit by a support rack.

5. The apparatus as defined in claim 4 in which said support rack comprises a plurality of legs positioning said ring in spaced relationship to said conduit, said legs radiating from a member positioned in encompassing relationship to said conduit.

References Cited

UNITED STATES PATENTS

| | | | |
|---|---|---|---|
| 2,375,798 | 5/1945 | Krejci | 23—259.5 X |
| 2,864,673 | 12/1958 | Nannini | 23—259.5 |
| 2,976,127 | 3/1961 | Latham | 23—209.4 X |
| 3,003,854 | 10/1961 | Heller | 23—259.5 X |
| 3,013,865 | 12/1961 | Webster et al. | 23—259.5 |
| 3,079,236 | 2/1963 | Heller et al. | 23—259.5 X |
| 3,355,247 | 11/1967 | Krejci et al. | 23—259.5 X |
| 3,376,111 | 4/1968 | Stegelman | 23—259.5 X |

MORRIS O. WOLK, Primary Examiner

D. G. CONLIN, Assistant Examiner

U.S. Cl. X.R.

23—209.4, 209.6; 264, 30